(12) United States Patent
Pellichero et al.

(10) Patent No.: US 12,358,464 B2
(45) Date of Patent: Jul. 15, 2025

(54) SYSTEM AND METHOD OF IMMOBILIZING A VEHICLE TO PREVENT VEHICLE THEFT

(71) Applicants: Bruno Thierry Robert Pellichero, Airdrie (CA); Hermann B Cuadros, Springfield, VA (US)

(72) Inventors: Bruno Thierry Robert Pellichero, Airdrie (CA); Hermann B Cuadros, Springfield, VA (US)

(*) Notice: Subject to any disclaimer, the term of this patent is extended or adjusted under 35 U.S.C. 154(b) by 0 days.

(21) Appl. No.: 19/006,986

(22) Filed: Dec. 31, 2024

(65) Prior Publication Data

US 2025/0136044 A1      May 1, 2025

Related U.S. Application Data

(63) Continuation-in-part of application No. 18/772,985, filed on Jul. 15, 2024.

(60) Provisional application No. 63/588,934, filed on Oct. 9, 2023.

(51) Int. Cl.
  *B60R 25/04* (2013.01)
  *B60R 25/102* (2013.01)
  *B60R 25/24* (2013.01)

(52) U.S. Cl.
  CPC ............ *B60R 25/04* (2013.01); *B60R 25/102* (2013.01); *B60R 25/24* (2013.01); *B60R 2325/205* (2013.01)

(58) Field of Classification Search
  CPC ....... B60R 25/04; B60R 25/102; B60R 25/24; B60R 2325/205
  See application file for complete search history.

(56) References Cited

U.S. PATENT DOCUMENTS

| | | |
|---|---|---|
| 5,473,200 A | 12/1995 | Woo |
| 6,897,762 B2 | 5/2005 | Howells |
| 8,918,251 B2 | 12/2014 | Tarnutzer et al. |
| 11,618,410 B2 | 4/2023 | Innocenzi et al. |
| 2002/0024260 A1 | 2/2002 | Ellingsworth |
| 2003/0011487 A1 | 9/2003 | Bracklo et al. |

(Continued)

FOREIGN PATENT DOCUMENTS

| | | | |
|---|---|---|---|
| CN | 108778869 A | * 11/2018 | ............ B60T 13/142 |
| EP | 1065112 A2 | 1/2001 | |

(Continued)

*Primary Examiner* — Lindsay M Low
*Assistant Examiner* — Charles J Brauch

(57) ABSTRACT

A system and method are used for immobilizing a vehicle to prevent vehicle theft. The system includes an immobilizer that can be retrofitted to the selected vehicle or integrated into the vehicle during the manufacturing process. The immobilizer includes a communication module that enables the immobilizer to be remotely controlled using a wireless signal. The wireless signal can be transmitted using different secure protocols including, but not limited to, Wi-Fi or Bluetooth encrypted signals. In addition, the wireless signal can be relayed over different secure networks. Further, the immobilizer may include one or more connectors and the corresponding wiring harnesses that enable the hardwire connection of the immobilizer to the appropriate vehicle component. Additionally, different methods such as disabling one or more data lines or disabling one or more engine sensors of the corresponding vehicle may be employed for immobilizing the vehicle.

18 Claims, 16 Drawing Sheets

(56) References Cited

U.S. PATENT DOCUMENTS

| | | | |
|---|---|---|---|
| 2007/0273489 | A1 | 11/2007 | Tauchi et al. |
| 2008/0258890 | A1* | 10/2008 | Follmer ................. G08G 1/052 340/439 |
| 2010/0052882 | A1 | 3/2010 | Sverrisson et al. |
| 2011/0291797 | A1 | 12/2011 | Tessier et al. |
| 2014/0229061 | A1 | 8/2014 | Tarnutzer et al. |
| 2016/0055699 | A1 | 2/2016 | Vincenti |
| 2018/0095456 | A1 | 4/2018 | Obaidi |
| 2020/0070773 | A1 | 3/2020 | Gennermann et al. |
| 2020/0217280 | A1* | 7/2020 | Hamad ................. F02D 19/081 |
| 2021/0048155 | A1* | 2/2021 | Sreshta ............... F21V 23/0435 |
| 2021/0237690 | A1 | 8/2021 | Sakurada et al. |
| 2022/0301437 | A1* | 9/2022 | Kinoshita .............. G06Q 10/20 |
| 2023/0062323 | A1 | 3/2023 | Tessier et al. |

FOREIGN PATENT DOCUMENTS

| | | |
|---|---|---|
| EP | 1712438 B1 | 6/2012 |
| GB | 2271612 A | 4/1994 |

* cited by examiner

FIG. 14

SYSTEM AND METHOD OF IMMOBILIZING A VEHICLE TO PREVENT VEHICLE THEFT

The current application is a continuation-in-part (CIP) application of a U.S. non-provisional application Ser. No. 18/772,985 filed on Jul. 15, 2024. The U.S. non-provisional application Ser. No. 18/772,985 claims a priority to the U.S. Provisional Patent application Ser. No. 63/588,934 filed on Oct. 9, 2023.

FIELD OF THE INVENTION

The present invention relates generally to theft prevention systems. More specifically, the present invention provides a novel method of preventing vehicle theft by immobilizing the vehicle when a theft attempt is detected.

BACKGROUND OF THE INVENTION

Vehicle theft is a major issue around the world. Even with the development of more advanced safety technologies, people have been able to bypass the safety features of vehicles. For example, many vehicles have been able to be easily stolen without the use of a key or having to hot-wire the vehicle due to an exploit found in vehicles that lack an immobilizer. A vehicle immobilizer is a standard security feature in many vehicles that prevents the vehicle from starting or being driven unless the correct key or key fob is being used. Vehicle immobilizers have become an important feature due to the rise in popularity of remote start, keyless fobs, etc. However, there are ways to bypass the vehicle immobilizers, and these hacks are often exploited by knowledgeable thieves. Further, manufacturers and suppliers are often slow to provide solutions to fix these issues that leave vehicle owners with few options to protect their vehicles. So, there is a need for a better vehicle immobilizer to prevent vehicle thefts.

An objective of the present invention is to provide a novel system and method of immobilizing a vehicle to prevent vehicle theft. The present invention accomplishes this by interrupting or disabling access to the vehicle's Engine Control Unit (ECU). The ECU disruption by the present invention can be performed in different ways to reduce the chances of thieves from bypassing the present invention. Another objective of the present invention is to provide a system and method of immobilizing a vehicle to prevent vehicle theft that can be remote controlled. The present invention enables the vehicle owner to control the immobilization of the vehicle remotely and selectively. The remote capabilities of the present invention also enable users to control several vehicles if necessary. Another objective of the present invention is to enable the retrofitting of the present invention to a vehicle or for the installation of the present invention to the vehicle during the manufacturing process. Additional features and benefits of the present invention are further discussed in the sections below.

SUMMARY OF THE INVENTION

The present invention provides a system and method of immobilizing a vehicle to prevent vehicle theft. The system of the present invention includes an immobilizer that can be retrofitted to the selected vehicle or integrated into the vehicle during the manufacturing process. The immobilizer includes a communication module that enables the immobilizer to be remotely controlled using a wireless signal. The wireless signal can be transmitted using different secure protocols including, but not limited to, Wi-Fi or Bluetooth encrypted signals. In addition, the wireless signal can be relayed over different secure networks. Further, the immobilizer of the present invention can include one or more connectors and the corresponding wiring harnesses that enable the hardwire connection of the immobilizer to the appropriate vehicle component. Furthermore, the immobilizer of the present invention can be equipped with a watertight enclosure that protects all the components of the immobilizer. Additional features and benefits of the present invention are further discussed in the detailed description section below.

BRIEF DESCRIPTIONS OF THE DRAWINGS

Figure 14:
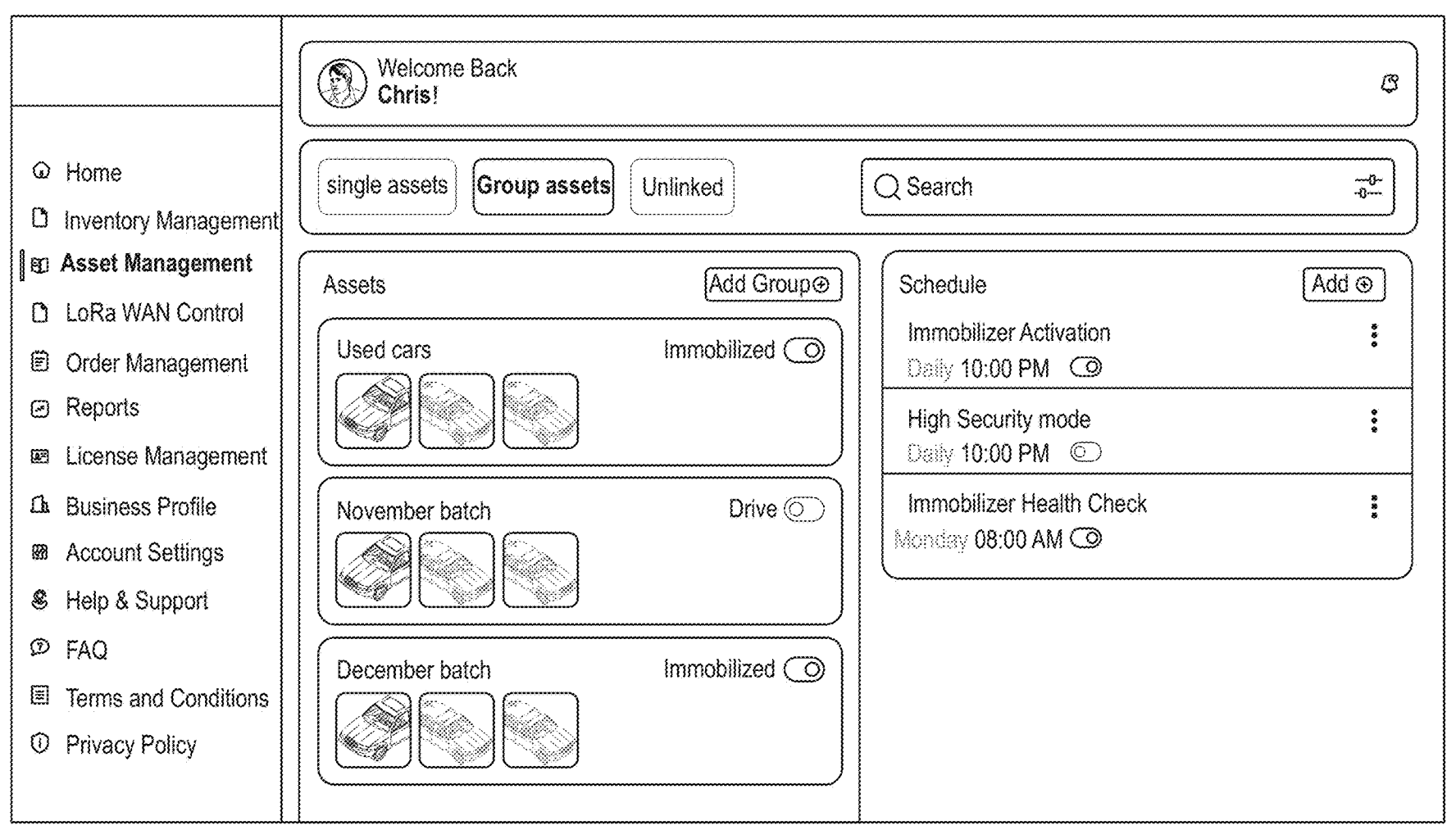

FIG. 14 is a view of an interface of a management system, displaying an overview of the fleet of vehicles and the immobilization schedule.

DETAIL DESCRIPTIONS OF THE INVENTION

All illustrations of the drawings are for the purpose of describing selected versions of the present invention and are not intended to limit the scope of the present invention.

Figure 1:
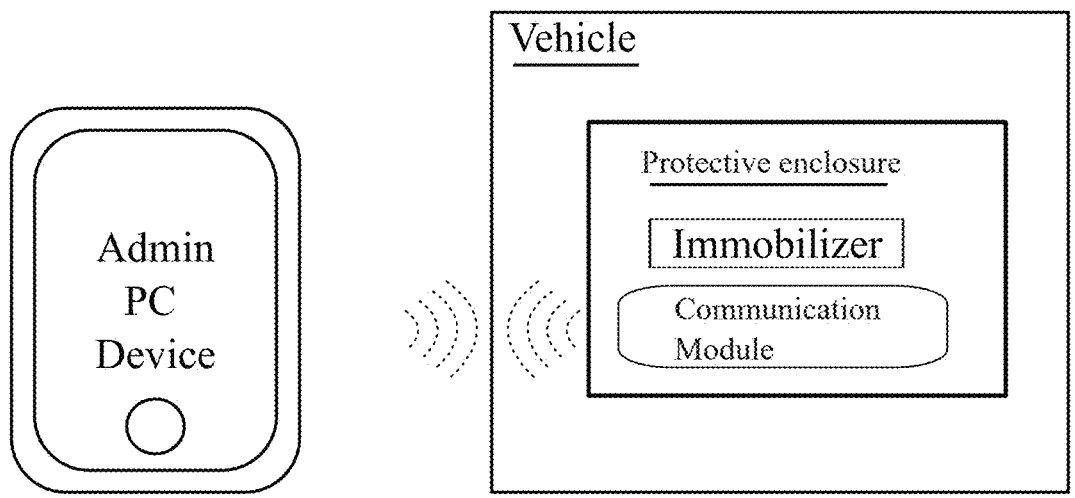
FIG. 1 is a schematic view of the present invention, wherein a single vehicle immobilizer is shown remotely controlled.
Figure 2:
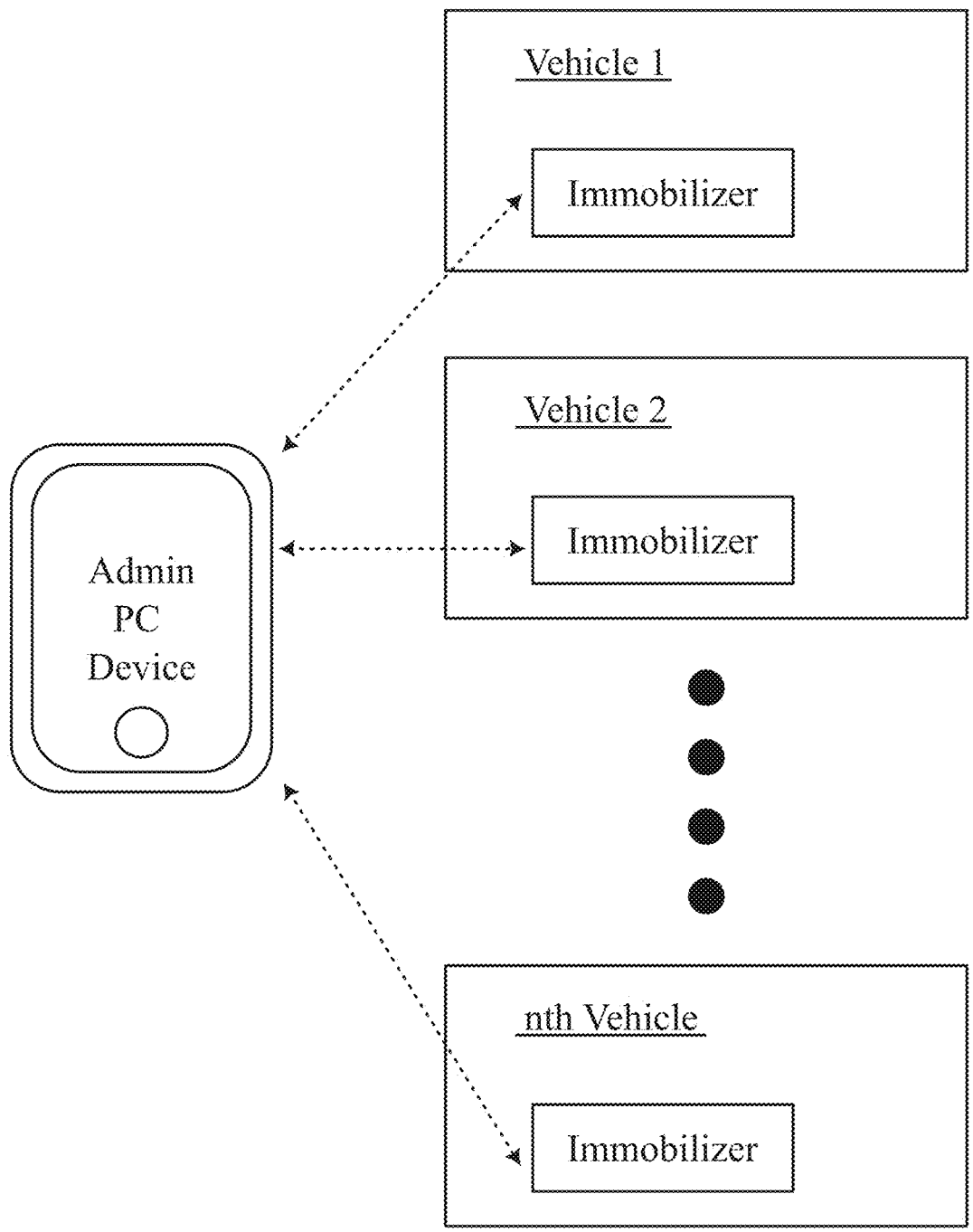
FIG. 2 is a schematic view of the present invention, wherein several vehicle immobilizers are shown remotely controlled.
Figure 5:
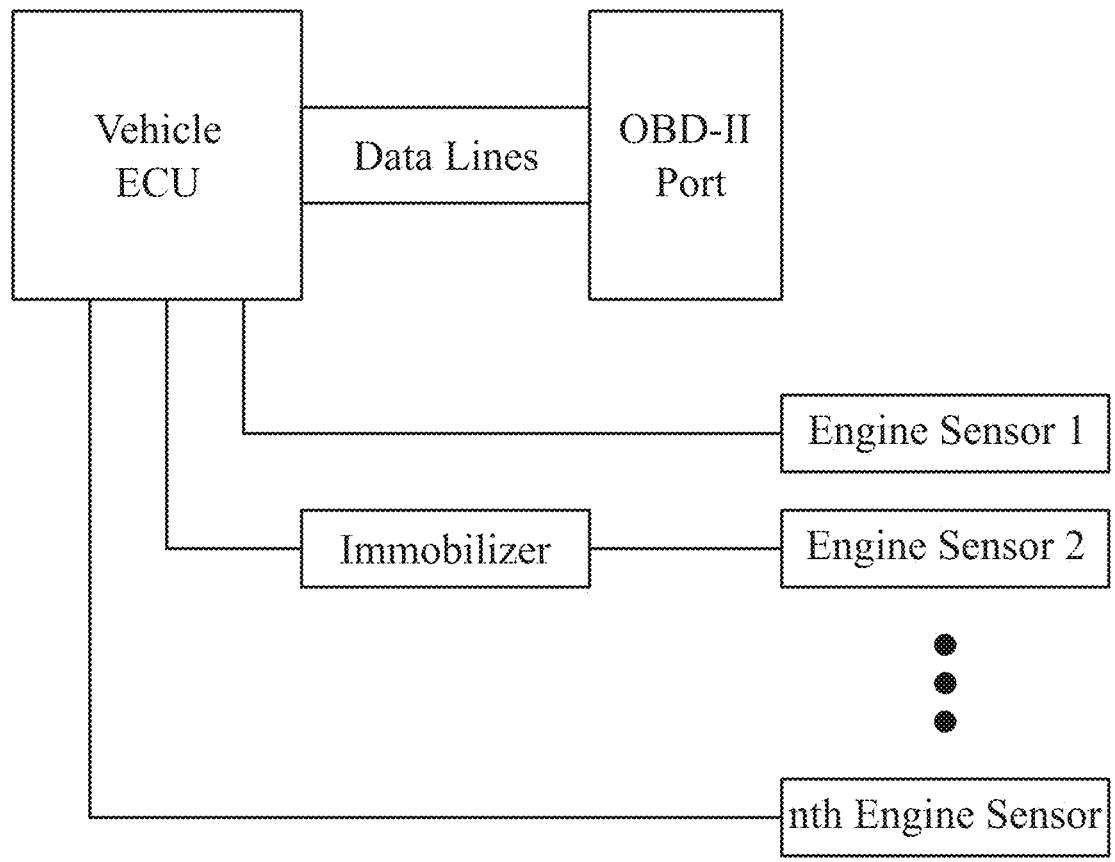
FIG. 5 is a schematic view of the present invention, wherein the vehicle immobilizer is shown connected to the vehicle ECU to disable a second engine sensor.
Figure 6:
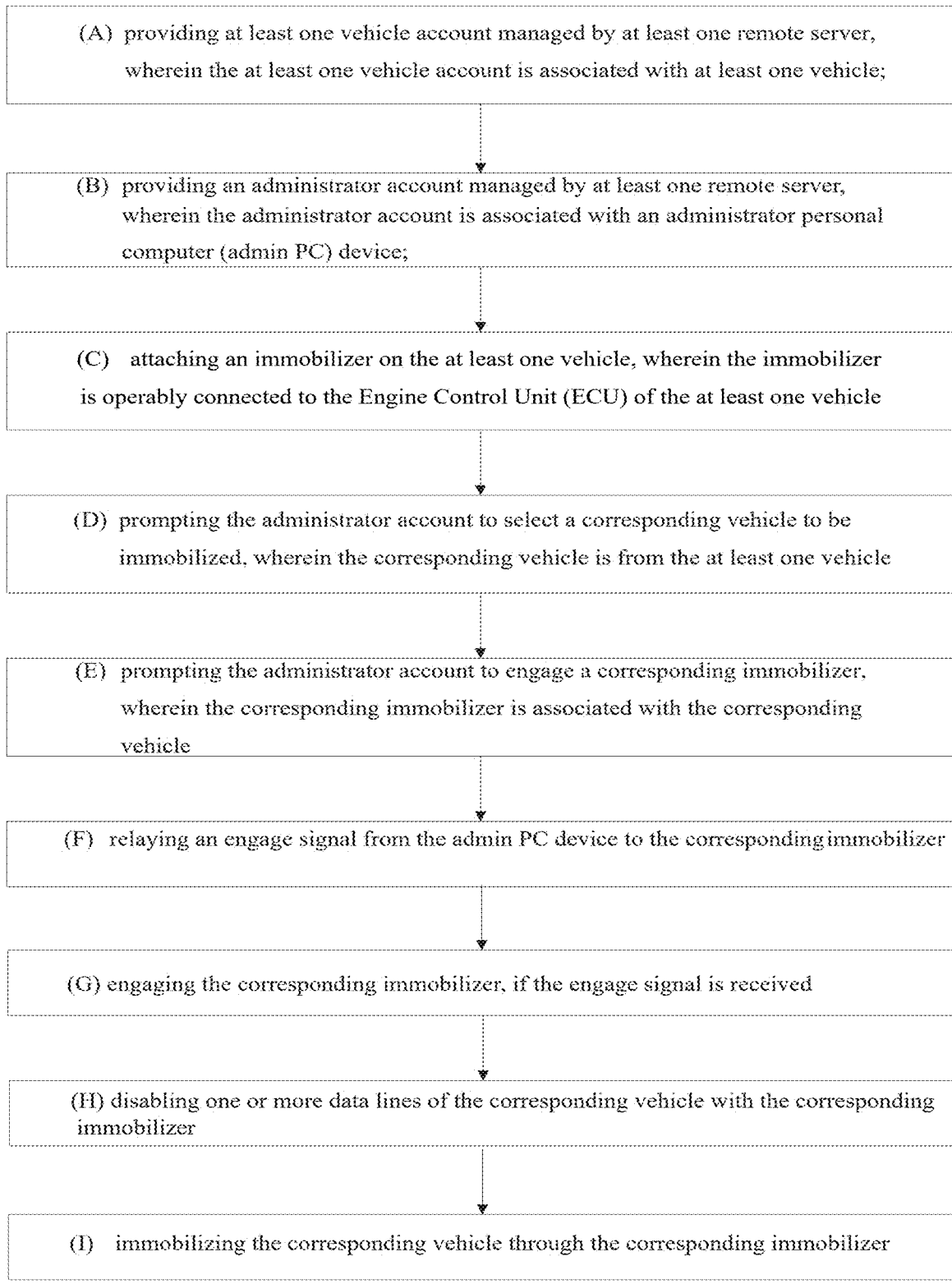
FIG. 6 is a flowchart showing a first method of the present invention, wherein the vehicle immobilizer is connected to the vehicle ECU to disable one or more data lines.
Figure 7:
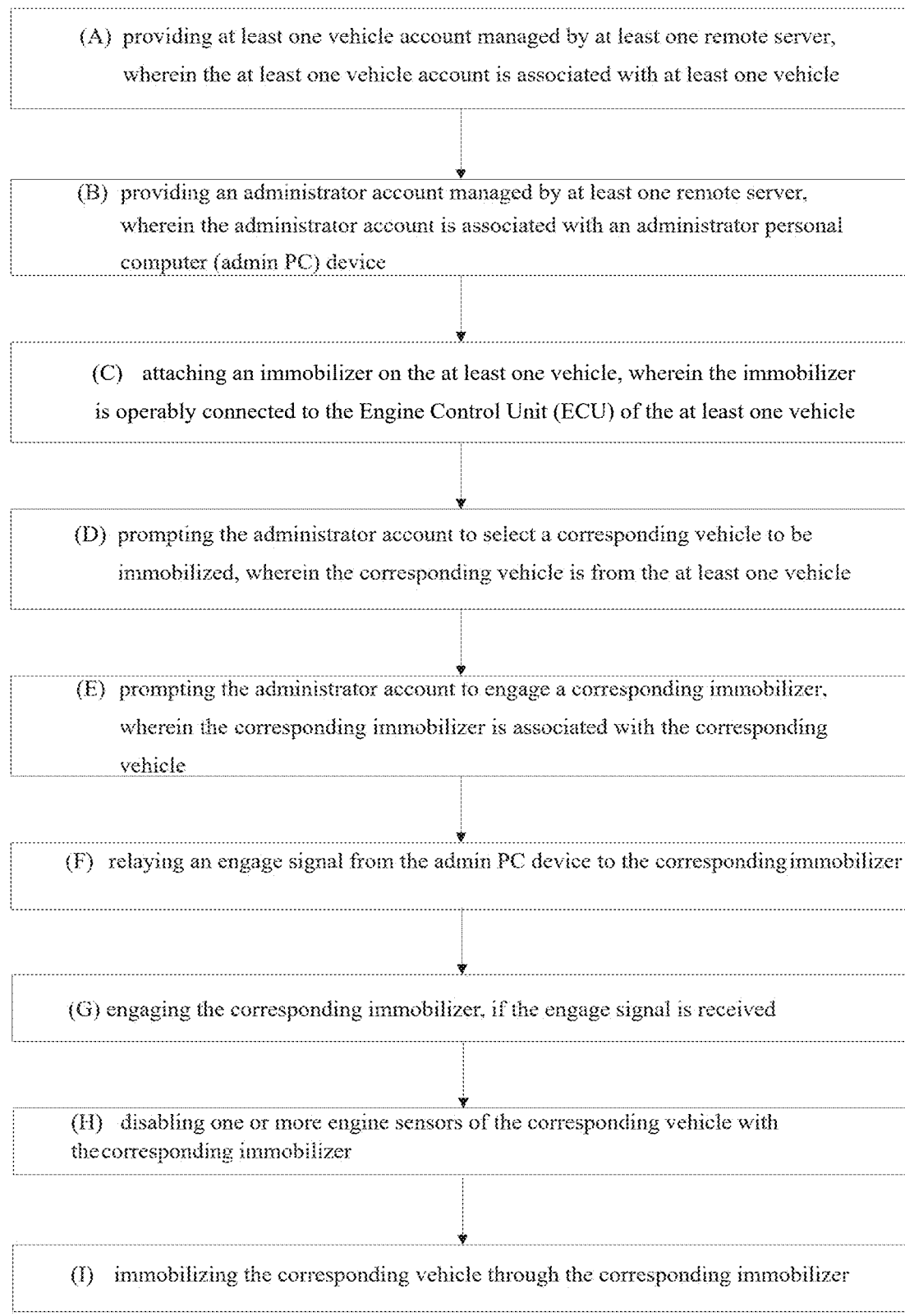
FIG. 7 is a flowchart showing a second method of the present invention, wherein the vehicle immobilizer is connected to the vehicle ECU to disable one or more engine sensors.

The present invention provides a system and a method for immobilizing a vehicle. The present invention immobilizes the vehicle using different methods that interrupt the access to the vehicle's Engine Control Unit (ECU). The following description is in reference to FIG. 1 through FIG. 11. As can be seen in FIG. 1, FIG. 6 and FIG. 7, the system used to implement the method of the present invention is provided with at least one vehicle account managed by at least one remote server (Step A). The at least one vehicle account is associated with at least one vehicle. The vehicle account enables the storage of vehicle information on the immobilizer that can be used for administrative functions. Further, the system used to implement the method of the present invention is provided with an administrator account managed by at least one remote server (Step B). The administrator account enables the vehicle owner or authorized user to remotely manage the immobilizer of one or more vehicles. Further, the administrator account is associated with an administrator personal computer (admin PC) device or a Cell phone Application that enables the user to perform the different administrative functions, such as remotely engaging the immobilizer. More specifically, the administrator account is tied to a single user who is able to interact, participate, and operate the corresponding admin PC device during the immobilizing process. The admin PC device allows a user to interact with the present invention and can be, but is not limited to, a smart phone, a cell phone application, a laptop, a desktop, or a tablet PC. To that end, the present invention works on operating systems, mobile applications, and/or may be embedded into websites. The remote server is used to facilitate communication between the plurality of user accounts. Moreover, the remote server is used to execute a number of internal processes for the present invention and is used to store message data.

As previously discussed, the present invention can implement different means to immobilize the vehicle that reduces the chances of unauthorized users bypassing the immobilizer. Accordingly, the overall method of the present invention further comprises the steps of attaching an immobilizer on the at least one vehicle (Step C). As can be seen in FIG. 1 through FIG. 5, the system of the present invention includes an immobilizer that can be installed on a vehicle. The immobilizer can be designed to be retrofitted to the vehicle or be installed on the vehicle during the manufacturing process. The immobilizer is provided with the appropriate connectors and the corresponding wiring harnesses that enable the wiring of the immobilizer to the appropriate electronic components of the vehicle.

Figure 3:
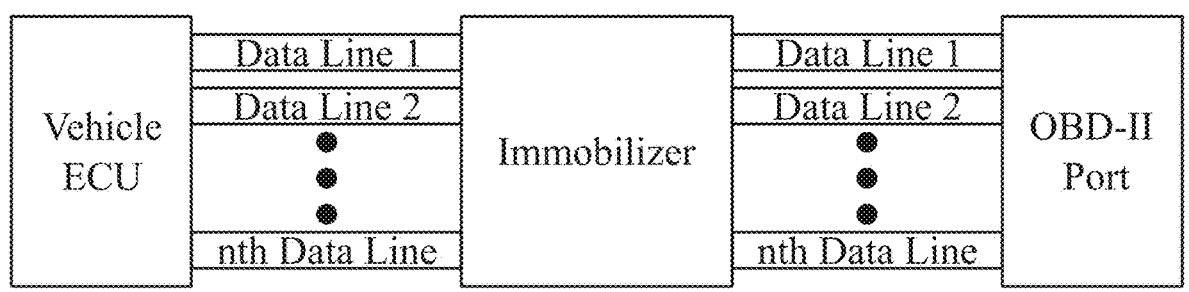
FIG. 3 is a schematic view of the present invention, wherein the vehicle immobilizer is shown connected to the vehicle ECU to disable one or more data lines.

In order to implement different means to immobilize the vehicle, the overall method of the present invention comprises the steps of prompting the administrator account to select a corresponding vehicle to be immobilized (Step D). In other words, the administrator or user selects a particular vehicle from at least one vehicle through an application or through a link in the admin PC device. More specifically, the corresponding vehicle is from the at least one vehicle. For example, the corresponding vehicle may be a single vehicle from a bunch of vehicles in a dealership or a personal vehicle of an individual user. The overall method further comprises the steps of prompting the administrator account to engage a corresponding immobilizer (Step E). Here, the corresponding immobilizer is associated with the corresponding vehicle. In other words, the corresponding immobilizer is the immobilizer that has been installed in the corresponding vehicle. Once the administrator account is ready and has selected the corresponding device, an engagement signal is relayed from the admin PC device or cell phone application to the corresponding immobilizer (Step F). Subsequently, the overall method comprises the steps of engaging the corresponding immobilizer, if the engage signal is received (Step G). As previously discussed, the present invention can implement different means to immobilize the vehicle that reduces the chances of unauthorized users bypassing the immobilizer. As can be seen in FIG. 3 and FIG. 6, a method of the present invention to immobilize the vehicle involves disabling the data lines to the ECU, irrespective of whether the vehicle is running or not. In other words, the overall method comprises the steps of disabling one or more data lines of the corresponding vehicle with the corresponding immobilizer (Step H). In this embodiment, the immobilizer disables the ECU by either connecting the immobilizer directly in line with the Onboard Diagnostic connector (OBD2 Connector). Alternatively, the immobilizer can be connected directly in line, at the ECU connector, by splicing the existing ECU's data lines into the immobilizer. The data lines can include, but are not limited to, SAE J1850 Bus, ISO15765-4/CAN Bus, ISO9141 K&L Lines, etc. The specific data lines can change according to the vehicle manufacturer's specifications that enable access to the ECU for diagnostic and programming purposes, such as maintenance and troubleshooting. Thus, the overall method of the present invention subsequently comprises the steps of immobilizing the corresponding vehicle through the corresponding immobilizer (Step I).

Continuing with the preferred embodiment, a subprocess of the method of the present invention includes the steps of providing a protective watertight enclosure and a communication module, wherein the at least one the immobilizer and the communication module are mounted within the protective watertight enclosure. In other words, the immobilizer is equipped with a protective watertight enclosure that protects all the immobilizer components. Further, the communication module enables remote controlling of the immobilizer through the admin PC device during steps (D) through (I). Example standards of what the wireless communication module is capable of using include, but are not limited to, Bluetooth, WI-FI, GSM, CDMA, ZigBee, etc.

Figure 4:
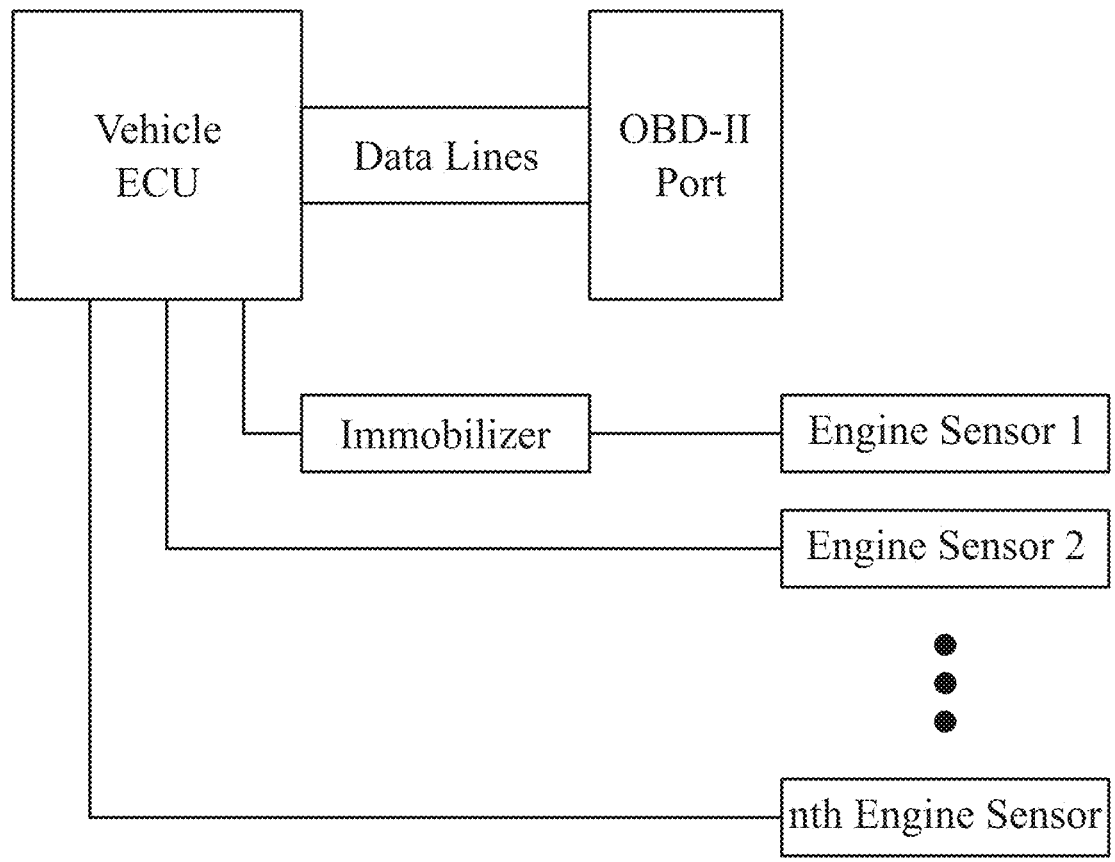
FIG. 4 is a schematic view of the present invention, wherein the vehicle immobilizer is shown connected to the vehicle ECU to disable a first engine sensor.

In another embodiment, and as seen in FIG. 7, the method of the present invention to immobilize the vehicle involves interrupting the vehicle engine's sensors signal(s) going to the ECU so that the ECU can no longer start and/or run the vehicle's engine. Interrupting the engine sensors immobilizes the vehicle since the ECU lacks the information needed to synchronize fuel injection and/or spark plugs ignition with the position of each piston/cylinder in the engine. Accordingly, in this embodiment, the overall method of the present invention after step G comprises disabling one or more engine sensors of the corresponding vehicle with the corresponding immobilizer (Step H). In this embodiment, one or more engine sensors comprise at least one of engine's timing sensor, accelerator pedal signal sensor, and engine's cam shaft sensor. In other words, and as can be seen in FIGS. 4, 5, and 7, authorized users can choose which engine sensor is interrupted depending on preference or, more importantly, depending on access to any of the engine sensors. For example, if the vehicle engine's timing sensor is too easy to access, then the timing sensor would not be a good choice since thieves could just as easily re-establish functionality by easily finding and removing the immobilizer from the circuit. Further, the accelerator pedal's signal is another sensor that can be interrupted so that the engine may be started but the accelerator would not be usable. Thus, the vehicle would be left idle without any possibility of increasing engine power. Further, the vehicle timing sensor is another sensor that can be interrupted to immobilize the vehicle. The engine would be impossible to start as the ECU would not be able to determine the position of each piston in the engine so that the ECU could not initiate any fuel injection or spark plug ignition. Further, the vehicle engine's cam shaft sensor is another sensor that can be interrupted by this immobilizer. The ECU would not be able to determine the cam shaft position within the engine which disables the starting of the engine or strictly run it in "Safe Mode", which dramatically reduces the power the engine can produce. Further, the vehicle's fuel pump power wire/relay is also a component that can be interrupted by the immobilizer. The vehicle's engine could not be started for lack of fuel going to the engine. In other embodiments, different sensors or components can be selectively disabled to immobilize the vehicle.

As previously discussed, the system of the present invention enables authorized users to perform different administrative functions using the corresponding administrator PC device. More specifically, the vehicle account enables the storage of the vehicle information on the immobilizer for enabling administrative functions. To that end, a subprocess of the present invention comprises the steps of providing a user interface (UI). The subprocess continues by enabling the administrator account to manage the at least one vehicle with the at least one immobilizer remotely, through the UI on the corresponding admin PC device. That is, in the preferred embodiment, the system of the present enables the authorized user to manage the vehicle with an installed immobilizer remotely. More specifically, through the UI on the corresponding administrator PC device, the authorized user can create a vehicle account that stores different information about the vehicle that is equipped with the immobilizer, such as the vehicle year, brand, color, VIN number, etc. Authorized users can create and store several vehicle accounts so that the authorized users can manage different vehicles with the corresponding immobilizers. For example, dealerships can manage the vehicles in the dealership's inventory so that all vehicles equipped with an immobilizer can be remotely managed. The UI can include a feature that enables the authorized user to manage the several vehicle accounts collectively or individually. Furthermore, the UI can enable the authorized user to edit or erase existing vehicle accounts. For example, if a vehicle is sold, the authorized user can remove the vehicle from the corresponding administrator PC device so that the new owner can solely control the immobilizer.

In a third embodiment, as seen in FIGS. 8-9 and 14-15, the system of the present invention enables the user to remotely schedule activation times for immobilizing an entire fleet of vehicles. This feature is especially useful for car dealerships, which require a heightened level of anti-theft protection for their fleet of vehicles parked on the lot at night. This ability to auto-schedule immobilization is both advantageous and convenient for a dealership. Specifically, in terms of advantage, this feature helps mitigate the risk of accidentally leaving an unsecured vehicle on the lot overnight which could result in vehicle theft or break-in. And in terms of convenience, this feature eliminates the time-consuming task of having to manually secure each vehicle on the dealership's lot just before closing. Thus, the present invention allows the user to remotely set a scheduled activation time and deactivation time for every immobilizer in the vehicle fleet to be applied every day of the week or any number of days in the week.

Figure 8:
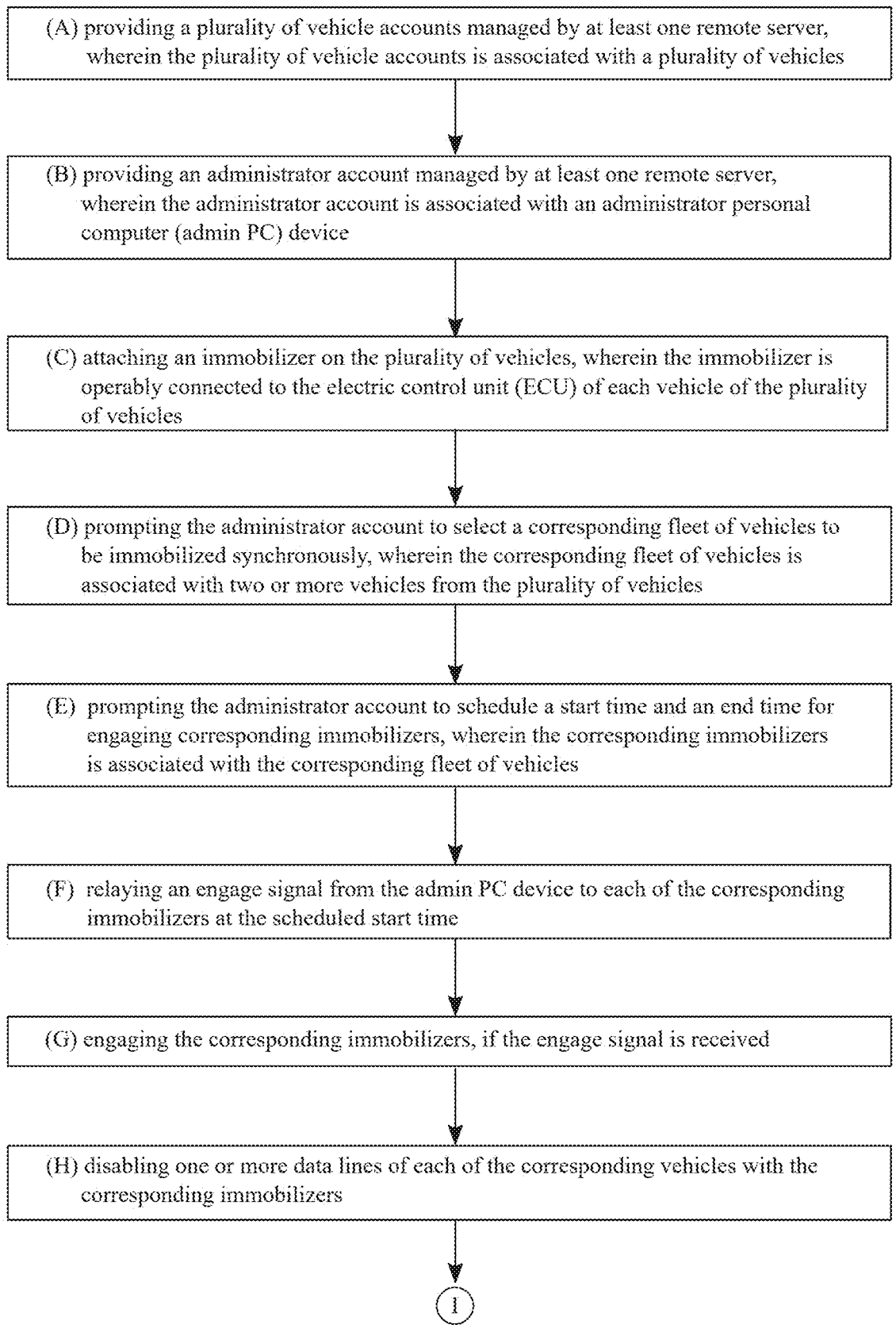
FIG. 8 is a flowchart showing a third method of the present invention, wherein the vehicle immobilizer is connected to the vehicle ECU to disable one or more data lines.

In this embodiment, as can be seen in FIG. 8, the overall method of the present invention comprises the steps of providing a plurality of vehicle accounts managed by at least one remote server (Step A). Here, the plurality of vehicle accounts is associated with a plurality of vehicles. The plurality of vehicles can be any large number of vehicles, such as a group of vehicles parked in a dealership lot. The vehicle account enables the storage of vehicle information on the immobilizer that can be used for administrative functions. Further in this embodiment, the overall method of the present invention comprises providing an administrator account managed by at least one remote server (Step B). The administrator account enables the vehicle owner or authorized user to remotely manage the immobilizer of the plurality of vehicles. Further, the administrator account is associated with an administrator personal computer (admin PC) device or a cell phone application that enables the user to perform the different administrative functions, such as remotely engaging the immobilizer. The overall method of the present invention further comprises the steps of attaching an immobilizer on each of the plurality of vehicles (Step C). Here, the immobilizer is operably connected to the engine control unit (ECU) of each vehicle of the plurality of vehicles. The overall method of the present invention further comprises the steps of prompting the administrator account to select a corresponding fleet of vehicles to be immobilized synchronously (Step D). Here, the corresponding fleet of vehicles is associated with two or more vehicles selected from the plurality of vehicles. Stated another way, the two or more vehicles selected represent a fleet of vehicles. Accordingly, in this embodiment, the overall method of the present invention after step D comprises prompting the administrator account to schedule a start time and an end time for engaging corresponding immobilizers, wherein the corresponding immobilizers is associated with the fleet of vehicles (step E and see FIG. 15). Stated another way, the administrator account can select two or more vehicles (i.e., fleet of vehicles) out of the total quantity of vehicles equipped with an immobilizer (i.e., plurality of vehicles), such that only the fleet of vehicles are immobilized by scheduled activation. The remaining vehicles not selected can still be immobilized remotely by the user, independent of the scheduled activation of the fleet of vehicles. This arrangement gives the user flexibility to select certain vehicles to represent the fleet, wherein the fleet of vehicles is governed by auto-scheduled activation. At any time after selection, the administrator account can add or remove vehicle accounts to and from the fleet using the admin PC device (see FIG. 14). After step E, the overall method of the present invention comprises the steps of relaying an engage signal from the admin PC device to each of the corresponding immobilizers at the scheduled start time (Step F). Subsequently, the overall method comprises the steps of engaging the corresponding immobilizers, if the engage signal is received (Step G). Thus, every corresponding vehicle within the fleet is immobilized at the same time by disabling one or more data lines of each of the corresponding vehicles (Steps H and I).

Figure 9:
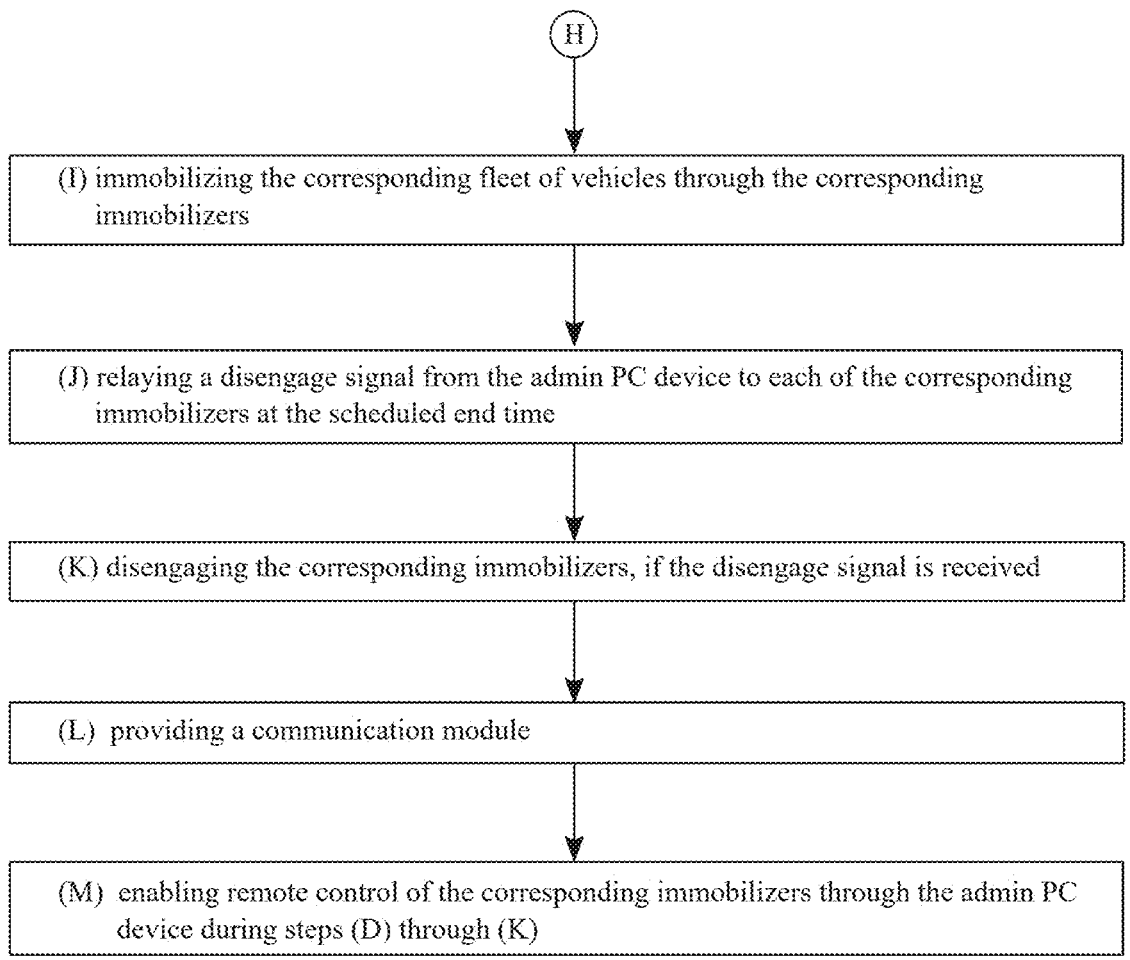
FIG. 9 is a continuing flowchart from FIG. 8.

Continuing with the third embodiment, as seen in FIG. 9 after step I, the overall method comprises the steps of relaying a disengage signal from the admin PC device to each of the corresponding immobilizers at the scheduled end time (Step J). Subsequently, the overall method comprises the steps of disengaging the corresponding immobilizers, if the disengage signal is received (Step K). Further, the overall method comprises the steps of providing a communication module (Step L). Next, in step M, the communication module enables remote control of the corresponding immobilizers through the admin PC device during steps (D)

through (K). Example standards of what the wireless communication module is capable of using include, but are not limited to, Bluetooth, WI-FI, GSM, CDMA, ZigBee, LoRa WAN, etc.

Figure 10:
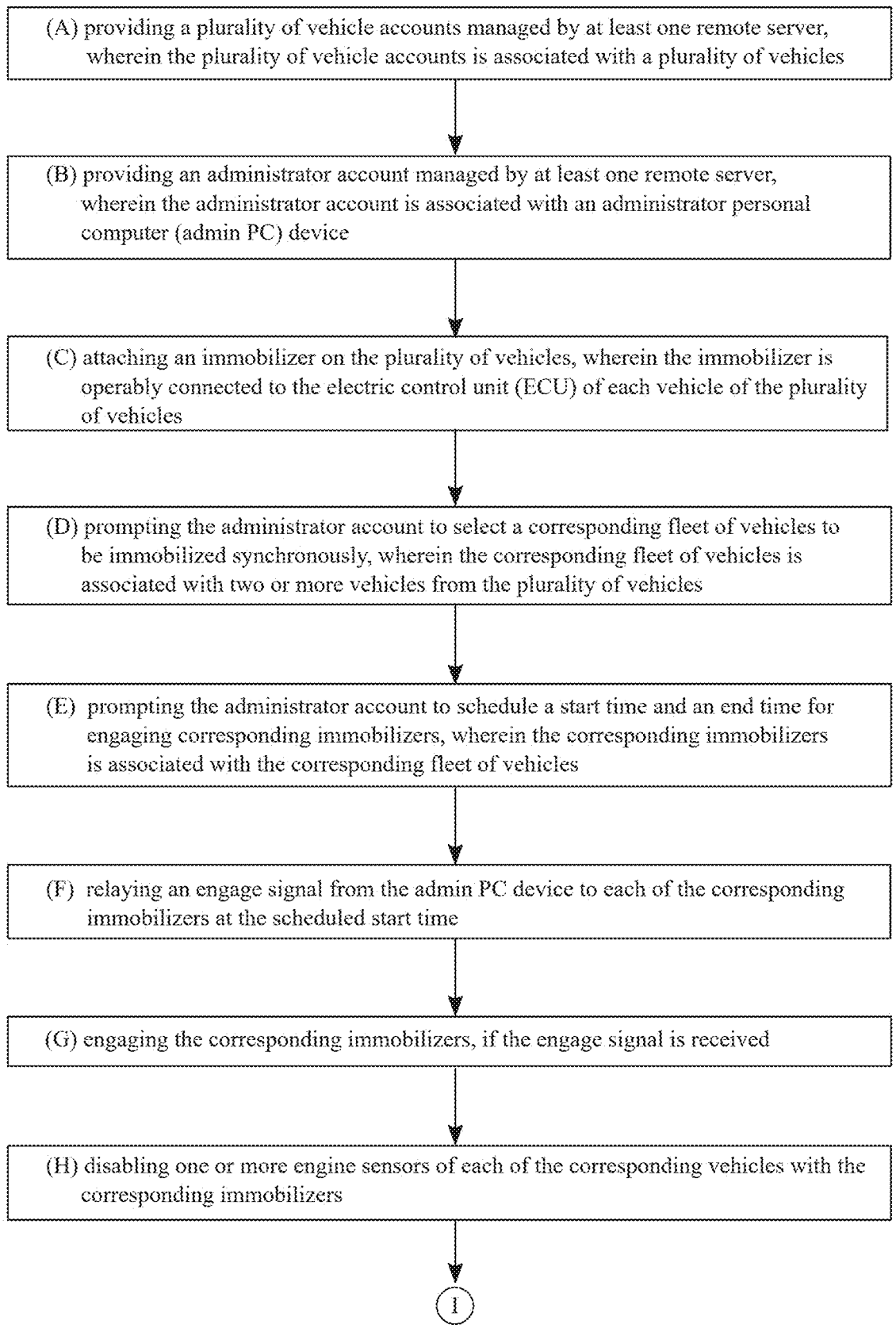
FIG. 10 is a flowchart showing a fourth method of the present invention, wherein the vehicle immobilizer is connected to the vehicle ECU to disable one or more engine sensors.
Figure 11:
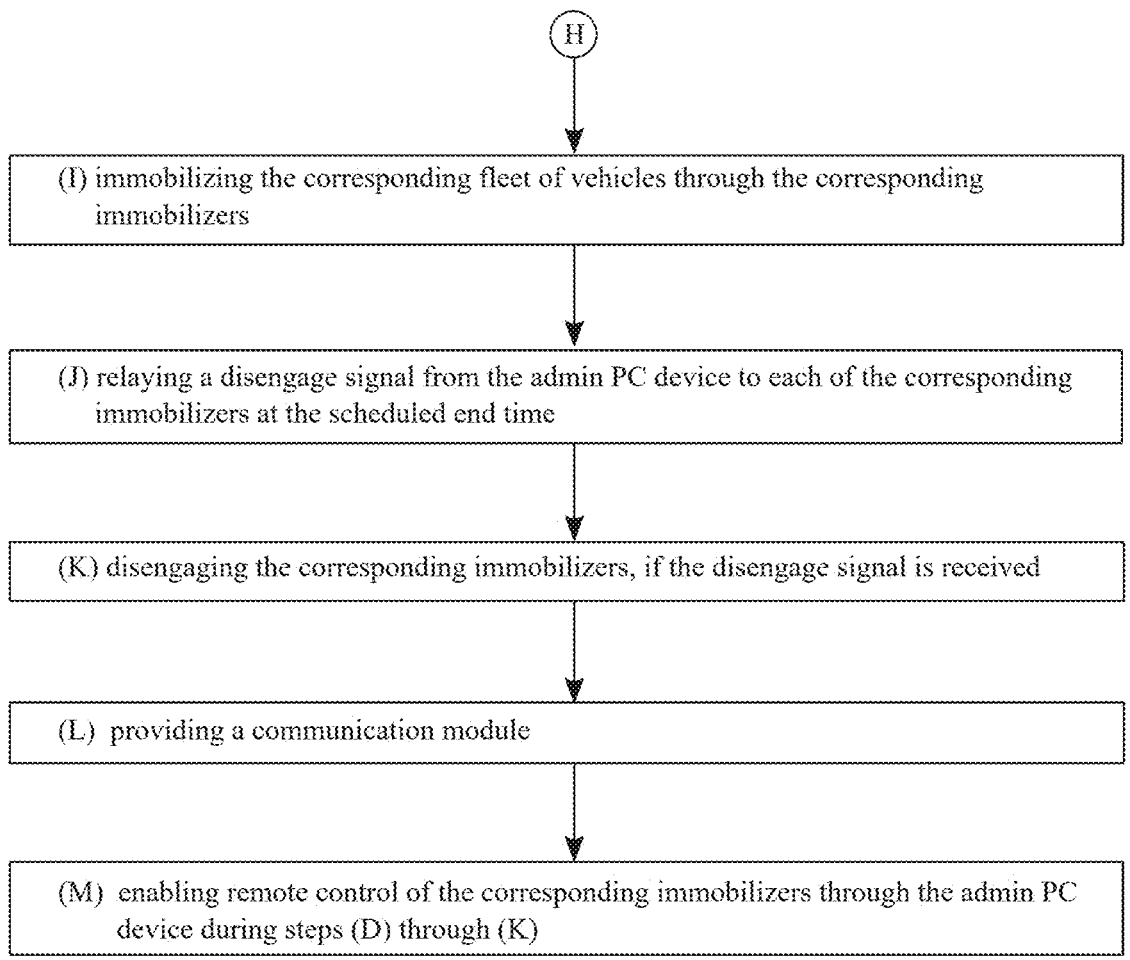
FIG. 11 is a continuing flowchart from FIG. 10.

In a fourth embodiment, as seen in FIGS. 10-11, the method of the present invention involves interrupting the vehicle engine's sensors signal(s) going to the ECU so that the ECU can no longer start and/or run the vehicle's engine. Accordingly, in this embodiment, the overall method of the present invention after step G comprises disabling one or more engine sensors of each of the corresponding vehicles with the corresponding immobilizers (Step H).

Further, the system of the present invention also enables the implementation of different user profiles that enables several users to temporarily have authorization to engage the immobilizer on the corresponding vehicle. To that end, a subprocess of the present invention comprises the steps of providing a plurality of temporary user accounts. Furthermore, the subprocess continues by enabling the plurality of temporary user accounts to temporarily have authorization to engage the immobilizer on the corresponding vehicle. For example, if the vehicle owner lends the vehicle to a family member, the vehicle owner can provide temporary access to the family member so that the family member can activate the immobilizer when necessary. Further, each user profile can store different user preferences that correspond to the method of choice to immobilize the vehicle when necessary. More specifically, each of the temporary user accounts stores different user preferences that correspond to a method of choice to immobilize the corresponding vehicle. The user's preference is determined upon installation of the immobilizer using a specific wiring harness. So, the same brand/model of vehicle can be immobilized by using different sensors or data lines interrupting methods. In other words, the administrator account's choice on how to immobilize the vehicle is determined upon installation of the immobilizer using a specific wiring harness. This increases the safety of the vehicle to prevent unauthorized users from getting vehicle information. If the immobilizer is set to disrupt the vehicle engine's sensors, the vehicle owner can disable the corresponding immobilizer so that the dealership can perform the required maintenance. In other embodiments, different administrative features can be implemented that allow the authorized user to better manage the immobilizer of the corresponding vehicle.

Figure 12:
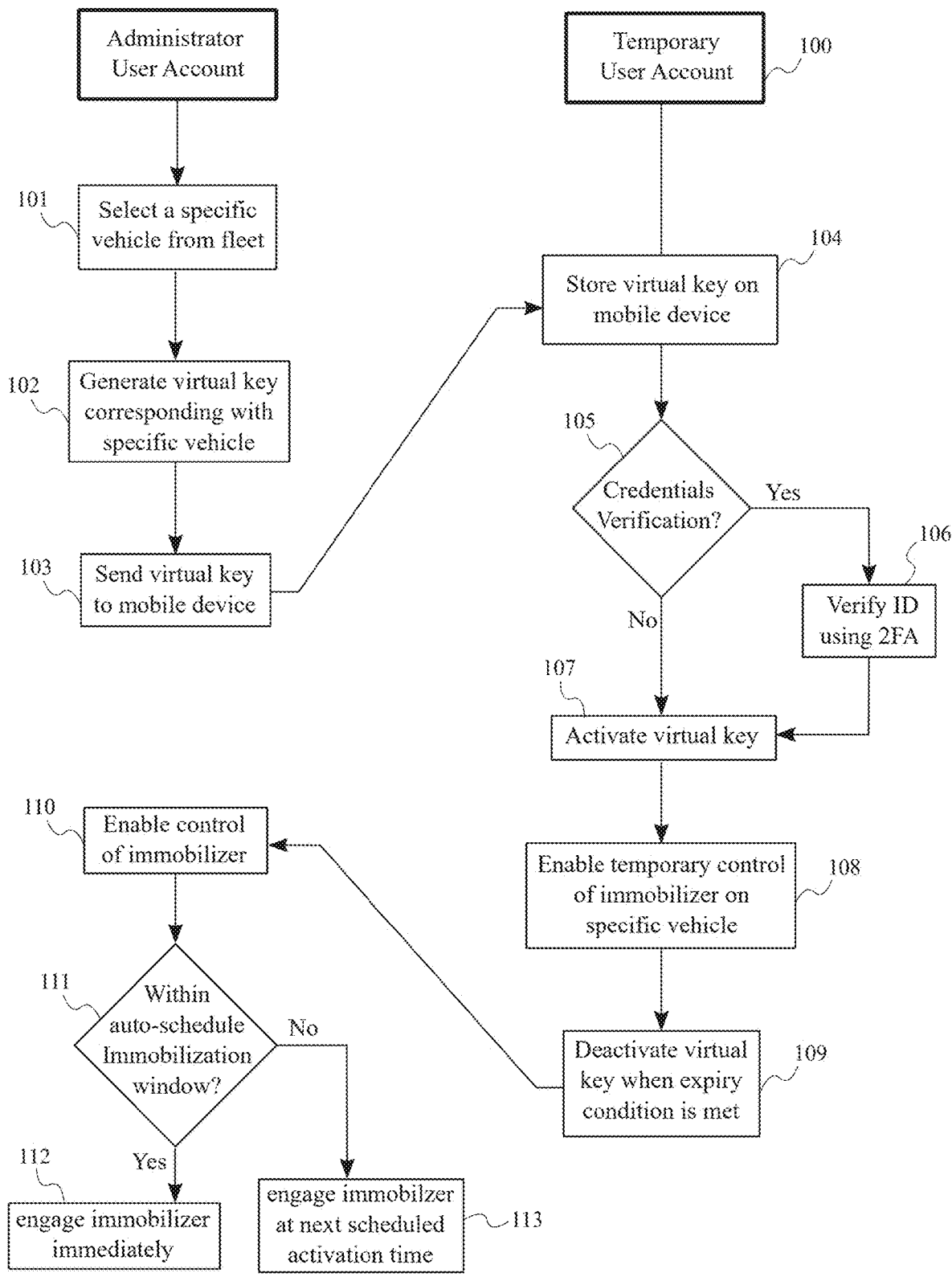
FIG. 12 is a flow chart showing a fifth method of the present invention, wherein temporary authorization is provided to a user for managing the vehicle immobilizer.

In reference to a fleet of vehicles, as seen in FIG. 12, the system of the present invention further enables the temporary user account to disable the immobilizer on a specific vehicle within the fleet of vehicles. This feature is especially useful for third parties such as mechanics and transporters, who may need access to a specific vehicle from the fleet in order to move the specific vehicle to a different location. The temporary user accounts can be set to auto-expire, and permissions can be customized based on access levels, ensuring high security. This minimizes risk by providing only necessary control to authorized users in dealerships and other large-fleet environments where multiple personnel often require temporary access to certain vehicles. As one example, many dealerships often rely on third party detailing shops to clean, wax, and detail the dealership's inventory of vehicles. Employees at the detailing shop may be tasked to work the nightshift (while the dealership is closed) to detail a specific vehicle scheduled to be shown to a prospective customer the next day and/or displayed in the dealer's showroom. But if all vehicles are scheduled to be immobilized at night, the detailing shop would be delayed in receiving the specific vehicle until the next morning. The temporary user account feature solves this problem by granting time-limited access to one or more employees at the detail shop, thereby allowing the employee to retrieve a specific vehicle from the dealer's lot and transport the vehicle to the detailing shop. After detailing is complete, the authorized employee can transport the specific vehicle back to the dealer's lot and then reengage the immobilizer. In another example, a customer may need to borrow a loaner vehicle for a day or two while their car is being repaired at the dealership. Alternatively, the customer may be interested in purchasing a specific vehicle on the dealer lot but prefers to borrow the vehicle overnight for a test drive. In each of these two scenarios, the temporary authorization feature grants the customer temporary authorization to engage and disengage the immobilizer for the borrowed vehicle.

Figure 16:
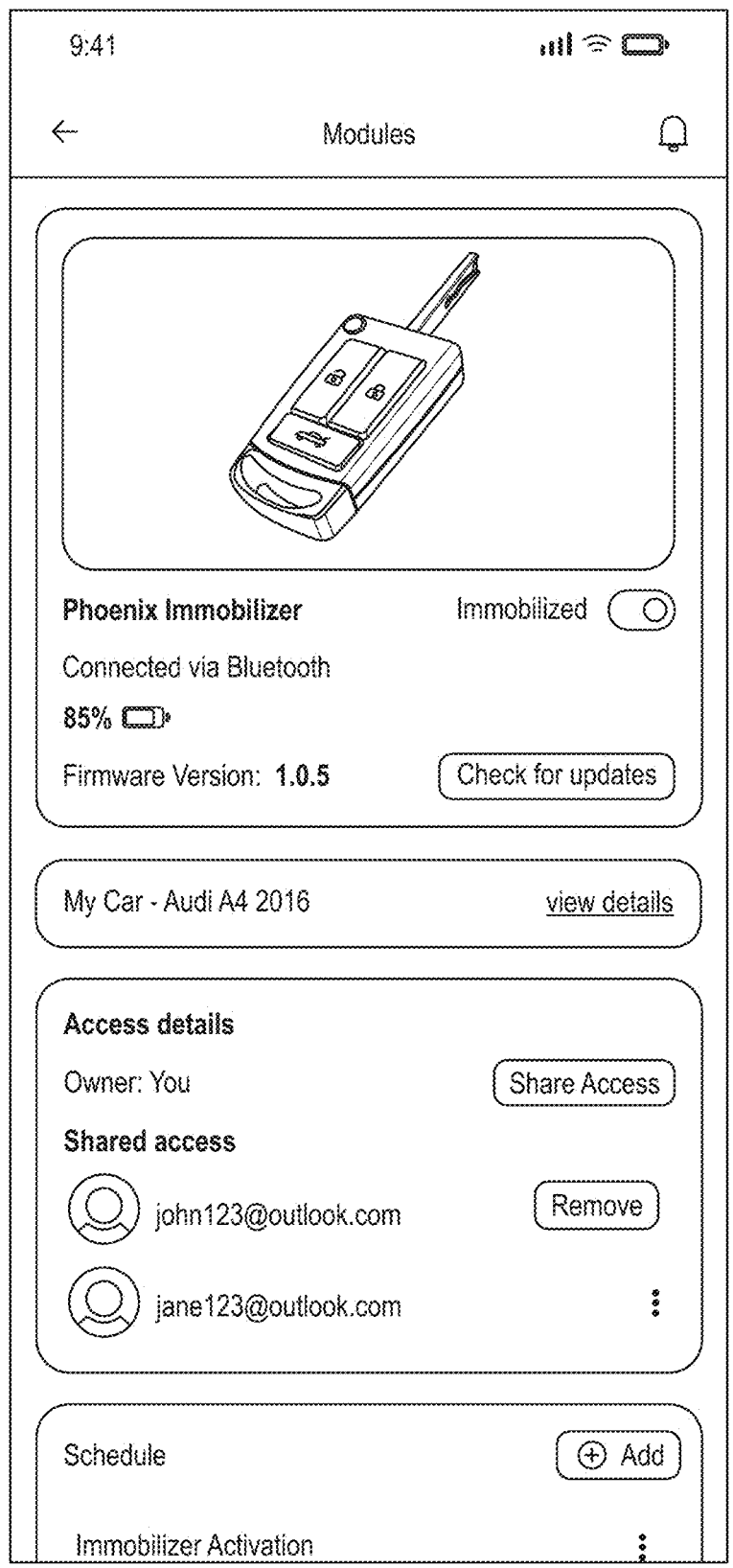
FIG. 16 is a view of an interface of a management system, displaying vehicle battery status and a list of temporary user accounts.

In this embodiment, as seen in FIG. 12, a subprocess of the present invention comprises the steps of providing at least one temporary user account (100), wherein the at least one temporary user account is from the plurality of temporary user accounts detailed above. The subprocess continues by prompting the administrator account to assign a specific vehicle from the fleet to the temporary user account. More specifically, the administrator or user is prompted to select a specific vehicle from the fleet of vehicles through an application or through a link in the admin PC device (101). The subprocess continues by generating a virtual key corresponding with the specific vehicle (102). In other words, a virtual key is automatically created after the administrator selects a specific vehicle, wherein the virtual key corresponds with the selected vehicle. Here, the virtual key is analogized/associated with a valet key configured for granting conditional access to the recipient, wherein the recipient has a limited amount of time to access the corresponding vehicle using the valet key. To that end, the subprocess continues by sending the newly created virtual key wirelessly to a mobile device associated with the temporary user account (103). The means by which the virtual key is sent to the mobile device is not limited. For example, the administrator user account can send the virtual key to an email address associated with the temporary user account as seen in FIG. 16, which can then be accessed using the mobile device. The virtual key has a preset expiry condition, wherein the temporary user account has authorization to engage or disengage the immobilizer on the specific vehicle until the expiry condition is met. Preferably, the expiry condition is managed and set by the administrator account through an application or through a link in the admin PC device. However, in other embodiments, the expiry condition can be predefined and automatically generated through an application in the admin PC device after the virtual key is created. Moreover, the expiry condition is not limited to any particular method for determining the start and end time. For instance, the expiry condition can be based on a predefined timer, wherein the timer begins when the virtual key is activated and expires after a predefined amount of time has passed (e.g., 1 hour). This configuration is most beneficial for transporters and mechanics who only need a short amount of time to move a vehicle off the dealer lot. Alternatively, the expiry condition can be based on a scheduled time slot, wherein the virtual key is activated inside the timeslot and deactivated outside the timeslot. For example, the time slot condition can be set to enable temporary control of the immobilizer starting at 8 pm today and then expire tomorrow morning at 6 am. This configuration is most beneficial for prospective customers who may want to take a specific vehicle home and test drive it before deciding whether to purchase.

Continuing with this embodiment, after sending the virtual key to the mobile device (103), the subprocess continues by storing the virtual key on the mobile device (104). The subprocess continues by activating the virtual key (107), which in turn, enables the temporary user account to have temporary authorization to engage and disengage the immobilizer installed on the specific vehicle remotely, through the user interface of the mobile device (108). Alternatively, as an added security measure, this step may be preceded by the implementation of credentials verification (105), such as two-factor authentication (2FA) or any other known method for verifying a person's identity (106). In this intermediary step, upon receiving the virtual key, the virtual key is not immediately activated. Instead, the temporary user is first prompted to provide at least two forms of identification. The two forms of identification can include but are not limited to a user password and an access code. The access code can be generated by an application and sent wirelessly to the email address associated with the temporary user account. Upon verification of the temporary user's identity, the subprocess continues by activating the virtual key (107), thereby enabling the temporary user account to have temporary authorization to engage and disengage the immobilizer on the specific vehicle (108). With this control, the temporary user account can override the auto-scheduling immobilization feature for the specific vehicle by disengaging the immobilizer and then driving the specific vehicle to a different location. The other vehicles within the fleet are unaffected and remain governed by the auto-scheduling immobilization feature outlined in steps D through M of the overall method. The subprocess continues by deactivating the virtual key in the mobile device when the expiry condition is met (109). The deactivated key disables temporary authorization to manage the immobilizer on the specific vehicle, and immediately returns control of the immobilizer back to the administrator user account (110). Thus, when the expiry condition is met, the immobilizer on the specific vehicle is once again governed by the auto-scheduling immobilization feature outlined in steps D through M. This means that if temporary authorization expires within the time window for scheduled activation (111), then an engage signal is immediately relayed from the admin PC device to the immobilizer of the specific vehicle. Thereafter, the immobilizer of the specific vehicle is engaged (112) and the remaining steps H through M of the overall method apply to the specific vehicle. Alternatively, if temporary authorization expires outside the time window for scheduled activation, then the immobilizer on the specific vehicle is not engaged until the next scheduled activation time (113).

Figure 13:
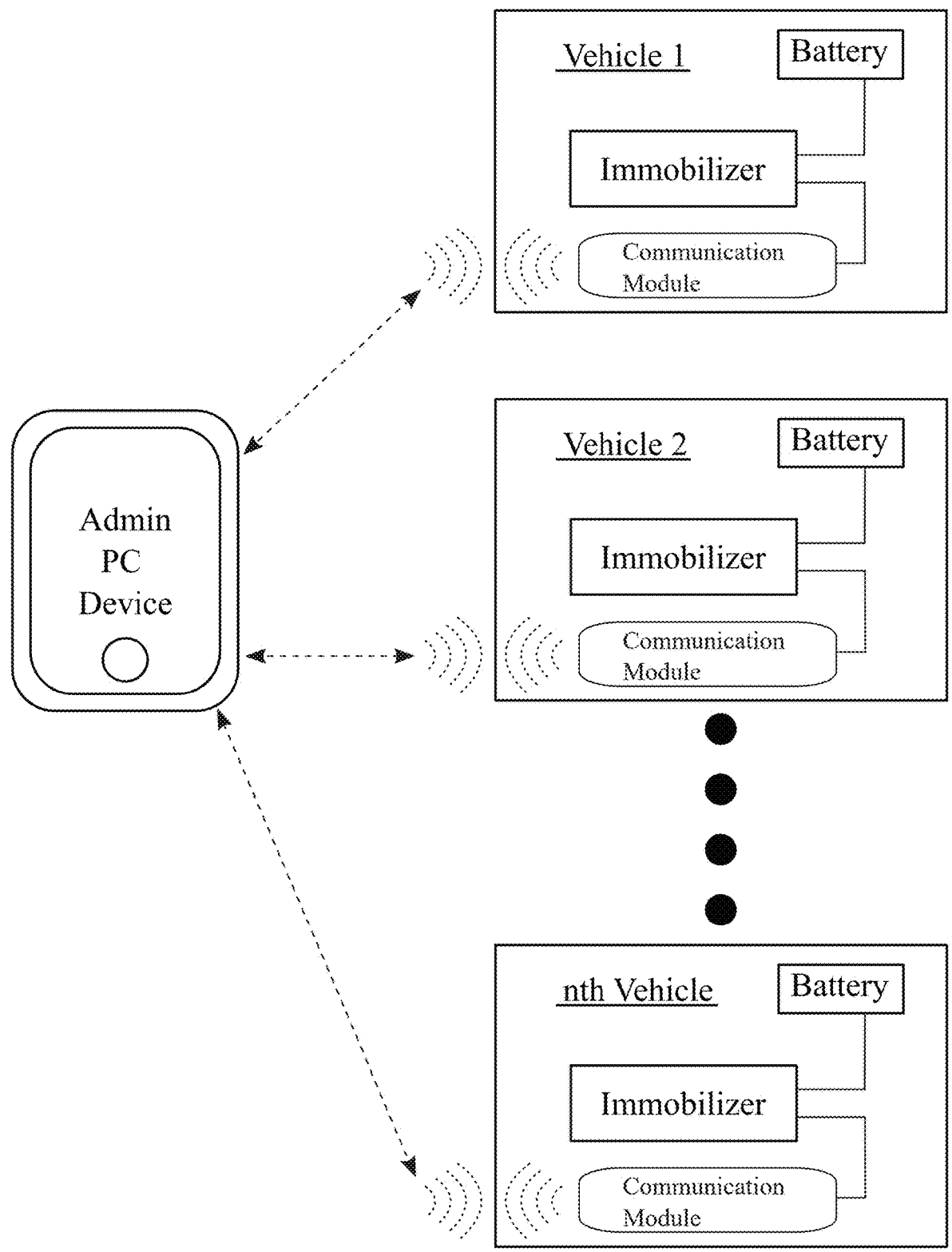
FIG. 13 is a schematic view of the present invention, wherein several vehicle immobilizers are shown remotely controlled via long-range wide area network (LoRa).
Figure 15:
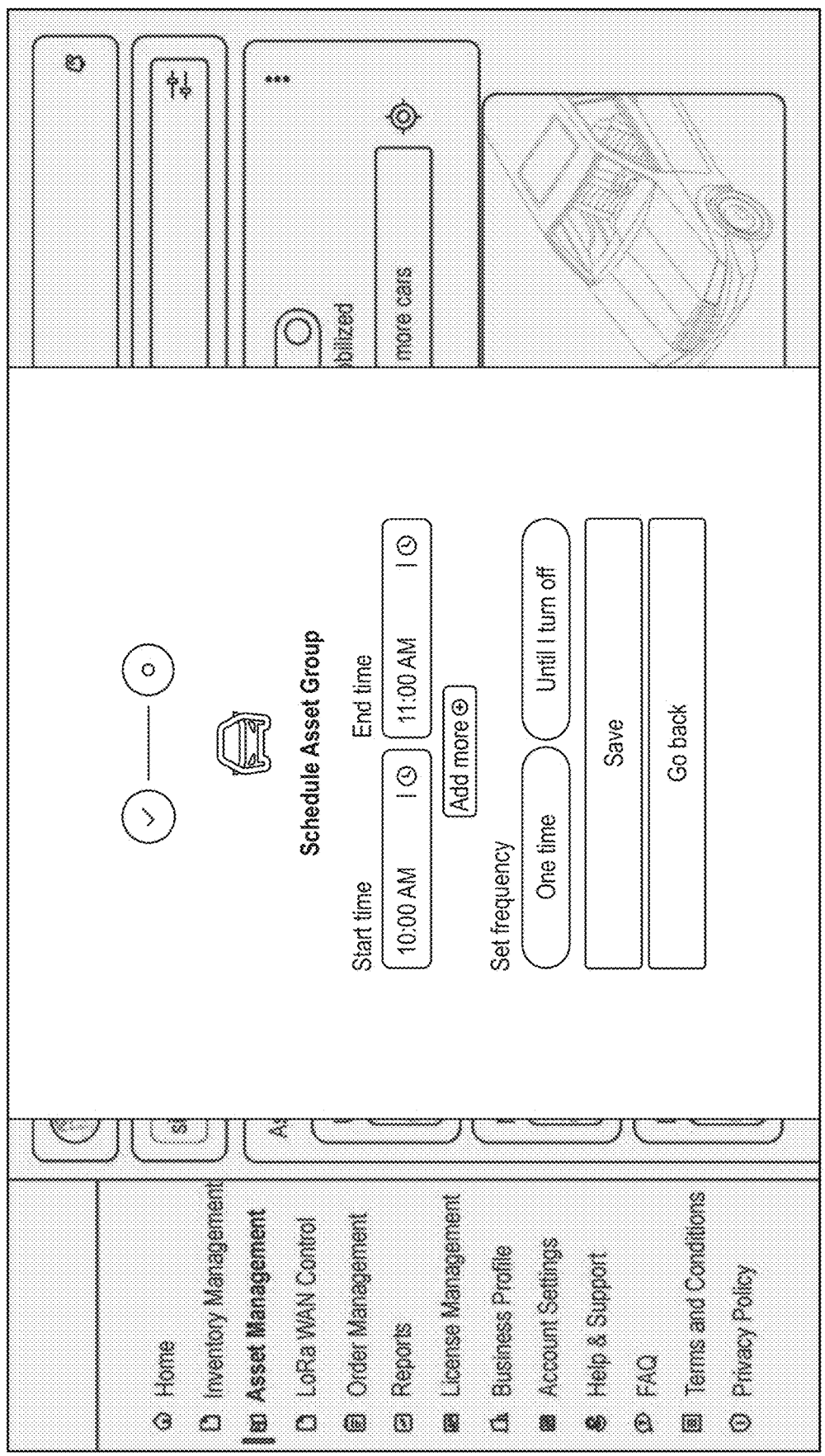
FIG. 15 is a view of an interface of a management system, wherein the user is prompted to schedule a start time and end time for immobilizing the fleet of vehicles.

In another embodiment, as seen in FIG. 13, the system of the present invention further enables the administrator user account to facilitate wireless communication with the immobilizer of any vehicle from the plurality of vehicles using long range wide area network (LoRA WAN) with geofence capability. Here, a geofence is defined as a virtual perimeter for a real-world geographical area that is widely used in location-based services. In other words, a geofence can include predefined boundaries (e.g., city limits) that allow an individual to track the location of the corresponding vehicle anywhere within the geofence boundaries. Using LoRa WAN, the administrator user account can monitor operational status, check battery health, and track the geographic location of any vehicle from the plurality of vehicles in real-time. The insights provided by these analytics support operational decisions for dealerships, allowing them to adjust inventory status or scheduling based on real-time conditions. In particular, the administrator account can track the geographical location of any vehicle equipped with an immobilizer in real-time, regardless of whether the corresponding vehicle is parked or in motion. With regard to battery status, this feature enables the administrator account to check the battery charge status of any vehicle from the plurality of vehicles. This feature is especially useful for dealership customers, wherein the dealership can send automatic notifications to their customer's cellphone regarding the health and charge status of their vehicle's battery.

In this embodiment, as seen in FIG. 13, a subprocess of the method of the present invention further comprises the steps of providing a communication module, wherein the communication module is configured for long-range wireless networking, including but not limited to LoRa WAN with geofence capability. The communication module enables long-range remote controlling of the immobilizer through the admin PC device during steps (D) through (K) of the overall method. Specifically, the communication module is capable of collecting and analyzing data from the immobilizer of the corresponding vehicle in real-time. The data to be analyzed in real-time include but is not limited to the geographical location and battery health status of the corresponding vehicle. To check the battery health status of the corresponding vehicle, the immobilizer is connected to the positive and negative battery terminals of the corresponding vehicle. Thus, the immobilizer is configured for receiving data associated with the battery health and the charge status. Thereafter, the communication module wirelessly sends the battery health and charge status data in real-time to the administrator PC device via long-range wireless network (see FIG. 16). Similarly, the communication module also wirelessly sends the geographical location data of the corresponding vehicle in real-time to the administrator PC device via long-range wireless network. Through the UI on the corresponding administrator PC device, the authorized user can track the geographical location and check the battery condition of the corresponding vehicle in real-time.

Although the invention has been explained in relation to its preferred embodiment, it is to be understood that many other possible modifications and variations can be made without departing from the spirit and scope of the invention.

What is claimed is:
1. A method of immobilizing a vehicle comprising the steps of:
(A) providing a plurality of vehicle accounts managed by at least one remote server, wherein the plurality of vehicle accounts is associated with a plurality of vehicles;
(B) providing an administrator account managed by at least one remote server, wherein the administrator account is associated with an administrator personal computer (admin PC) device;
(C) attaching an immobilizer on the plurality of vehicles, wherein the immobilizer is operably connected to the Engine Control Unit (ECU) of each vehicle of the plurality of vehicles;
(D) prompting the administrator account to select a corresponding fleet of vehicles to be immobilized synchronously, wherein the corresponding fleet of vehicles is associated with two or more vehicles from the plurality of vehicles;
(E) prompting the administrator account to schedule a start time and an end time for engaging corresponding immobilizers, wherein the corresponding immobilizers is associated with the corresponding fleet of vehicles;

(F) relaying an engage signal from the admin PC device to each of the corresponding immobilizers at the scheduled start time;

(G) engaging the corresponding immobilizers, if the engage signal is received;

(H) disabling one or more data lines of each of the corresponding vehicles with the corresponding immobilizers;

(I) immobilizing the corresponding fleet of vehicles through the corresponding immobilizers;

(J) relaying a disengage signal from the admin PC device to each of the corresponding immobilizers at the scheduled end time;

(K) disengaging the corresponding immobilizers, if the disengage signal is received;

(L) providing a communication module;

(M) enabling remote control of the corresponding immobilizers through the admin PC device during steps (D) through (K);

(N) providing at least one temporary user account managed by the at least one remote server;

(O) prompting the administrator account to select a specific vehicle from the fleet of vehicles;

(P) generating a virtual key corresponding with the specific vehicle, wherein:
the virtual key has an expiry condition; and
the virtual key grants temporary authorization to manage the immobilizer on the specific vehicle;

(Q) sending the virtual key to a mobile device associated with the at least one temporary user account;

(R) activating the virtual key on the mobile device;

(S) enabling the at least one temporary user account to manage the immobilizer on the specific vehicle remotely, through the mobile device;

(T) deactivating the virtual key on the mobile device when the expiry condition is met, wherein the deactivated virtual key disables temporary authorization to manage the immobilizer on the specific vehicle;

(U) relaying an engage signal from the admin PC device to the specific vehicle if the deactivating occurs within the start time and end time of step (E); and (V) engaging the immobilizer on the specific vehicle, if the engage signal is received.

2. The method of claim 1, wherein the immobilizer is retrofitted to each vehicle of the plurality of vehicles.

3. The method of claim 1, wherein the immobilizer is installed into each vehicle of the plurality of vehicles during the manufacturing process.

4. The method of claim 1, comprising the steps of:
providing a protective enclosure; and
mounting the immobilizer within the protective enclosure.

5. The method as claimed in claim 1, wherein the immobilizer disables the ECU by connecting the immobilizer directly in line with the Onboard Diagnostic connector (OBD2 Connector).

6. The method as claimed in claim 1, wherein the immobilizer disables the ECU by connecting the immobilizer directly in line, at the ECU connector, by splicing the existing ECU's data lines into the immobilizer.

7. The method as claimed in claim 1, wherein the vehicle account enables the storage of the vehicle information on the immobilizer for enabling administrative functions.

8. The method as claimed in claim 1, comprising the steps of:
providing a user interface (UI);
enabling the administrator account to manage the plurality of vehicles with the immobilizer remotely, through the UI on a corresponding admin PC device.

9. The method as claimed in claim 1, wherein the expiry condition of the virtual key is based on a predefined timer, wherein the timer starts when the virtual key is activated.

10. The method as claimed in claim 1, wherein the expiry condition of the virtual key is based on a scheduled time slot, wherein the virtual key is activated inside the time slot and is deactivated outside the time slot.

11. A method of immobilizing a vehicle comprising the steps of:

(A) providing a plurality of vehicle accounts managed by at least one remote server, wherein the plurality of vehicle accounts is associated with a plurality of vehicles;

(B) providing an administrator account managed by at least one remote server, wherein the administrator account is associated with an administrator personal computer (admin PC) device;

(C) attaching an immobilizer on the plurality of vehicles, wherein the immobilizer is operably connected to the Engine Control Unit (ECU) of each vehicle of the plurality of vehicles;

(D) prompting the administrator account to select a corresponding fleet of vehicles to be immobilized synchronously, wherein the corresponding fleet of vehicles is associated with two or more vehicles from the plurality of vehicles;

(E) prompting the administrator account to schedule a start time and an end time for engaging corresponding immobilizers, wherein the corresponding immobilizers is associated with the corresponding fleet of vehicles;

(F) relaying an engage signal from the admin PC device to each of the corresponding immobilizers at the scheduled start time;

(G) engaging the corresponding immobilizers, if the engage signal is received;

(H) disabling one or more engine sensors of each of the corresponding vehicles with the corresponding immobilizers;

(I) immobilizing the corresponding fleet of vehicles through the corresponding immobilizers;

(J) relaying a disengage signal from the admin PC device to each of the corresponding immobilizers at the scheduled end time;

(K) disengaging the corresponding immobilizers, if the disengage signal is received;

(L) providing a communication module;

(M) enabling remote control of the corresponding immobilizers through the admin PC device during steps (D) through (K);

(N) providing at least one temporary user account managed by the at least one remote server;

(O) prompting the administrator account to select a specific vehicle from the fleet of vehicles;

(P) generating a virtual key corresponding with the specific vehicle, wherein:
the virtual key has an expiry condition; and
the virtual key grants temporary authorization to manage the immobilizer on the specific vehicle;

(Q) sending the virtual key to a mobile device associated with the at least one temporary user account;

(R) activating the virtual key on the mobile device;

(S) enabling the at least one temporary user account to manage the immobilizer on the specific vehicle remotely, through the mobile device;

(T) deactivating the virtual key on the mobile device when the expiry condition is met, wherein the deactivated virtual key disables temporary authorization to manage the immobilizer on the specific vehicle;

(U) relaying an engage signal from the admin PC device to the specific vehicle if the deactivating occurs within the start time and end time of step (E); and (V) engaging the immobilizer on the specific vehicle, if the engage signal is received.

12. The method as claimed in claim 11, wherein one or more engine sensors comprises at least one of engine's timing sensor, accelerator pedal signal sensor, and engine's cam shaft sensor.

13. The method of claim 11, wherein the immobilizer is retrofitted to each vehicle of the plurality of vehicles.

14. The method of claim 11, wherein the immobilizer is installed into each vehicle of the plurality of vehicles during the manufacturing process.

15. The method of claim 11, comprising the steps of:

providing a protective watertight enclosure; and mounting the immobilizer within the protective watertight enclosure.

16. The method as claimed in claim 11, comprising the steps of:

providing a user interface (UI) on a corresponding admin PC device;

enabling the administrator account to manage the plurality of vehicles with the immobilizer remotely, through the UI on the corresponding admin PC device.

17. The method as claimed in claim 11, wherein the expiry condition of the virtual key is based on a predefined timer, wherein the timer starts when the virtual key is activated.

18. The method as claimed in claim 11, wherein the expiry condition of the virtual key is based on a scheduled time slot, wherein the virtual key is activated inside the time slot and is deactivated outside the time slot.

* * * * *